United States Patent [19]
Achelpohl

[11] Patent Number: 5,803,706
[45] Date of Patent: Sep. 8, 1998

[54] PALLETING DEVICE FOR PALLETING STACKS OF FLAT OBJECTS

[75] Inventor: Fritz Achelpohl, Lienen, Germany

[73] Assignee: Windmöller & Hölscher, Lengerich/Westf., Germany

[21] Appl. No.: 764,468

[22] Filed: Dec. 12, 1996

[30] Foreign Application Priority Data

Dec. 12, 1995 [DE] Germany .................. 195 46 389.7

[51] Int. Cl.⁶ ........................................... B65G 57/11
[52] U.S. Cl. .................................. 414/794.4; 414/793.5; 414/794.2
[58] Field of Search .................... 414/793.5, 794.2, 414/794.4

[56] References Cited

U.S. PATENT DOCUMENTS 4,778,323  10/1988  Salts ............................. 414/793.5 X

FOREIGN PATENT DOCUMENTS

| 0 218 833 | 4/1987 | European Pat. Off. | ............ 414/793.5 |
| 41 34 746A1 | 5/1992 | Germany . | |
| 94 18 577.8 | 2/1995 | Germany . | |

*Primary Examiner*—Janice L. Krizek
*Attorney, Agent, or Firm*—Evenson, McKeown, Edwards & Lenahan, PLLC

[57] ABSTRACT

A palleting device for palleting stacks of flat objects on a height-adjustable pallet includes a moving support device located above the pallet. The stacks are delivered onto the moving support device by a supply conveyor and into formation on the pallet or on a pallet stack forming on the pallet. The layer to be stacked is ejected from the support surface by a release motion of the support device while retaining the stacking pattern of the stack. In order to be able to place the palleted stack onto the support device so that it is lined up edge-to-edge, the supply conveyor is formed from two conveyor belts which are separately controllable and positioned in alignment with each other in a common plane parallel to the support device. The front delivery rollers of the belts can be moved in both the same and opposite directions by movement of lower conveyor belt strands.

4 Claims, 14 Drawing Sheets

PALLETING DEVICE FOR PALLETING STACKS OF FLAT OBJECTS

BACKGROUND OF THE INVENTION

1. Field of the Invention

The present invention relates to a palleting device for palleting stacks of flat objects, such as sacks or bags, with a pallet which can be moved up and down. A moving support device is located above the pallet. Stacks are delivered from a supply conveyor to the support device in formation on the pallet or on a pallet stack formed on the pallet. A layer to be stacked is ejected from the support device by a release motion of the device while the stacking pattern of the stack is retained.

2. Description of Related Art

A palleting device of this kind is known from DE-GM 9,418,577.8. In this known device, the supply conveyor consists of a transport belt which can move via its front diverter roller across the entire base surface of the pallet. A stop is provided independently of the position of the conveyor belt.

In the known palleting device, each stack is placed in a correct position on the support device and in its future delivery position on the pallet or on the forming pallet stack. Consequently, the stop is moved into a position which corresponds to the desired position of the front edge of the stack. Side alignment of the stack takes place by corresponding placement on the transport belt. If the stack has reached its front position because it has been moved against the stop, then the front diverter roller of the transport belt is moved back due to a corresponding withdrawal of only a lower strand. As a result, the stack tips over its leading edge and thus falls onto the support device. In this case, however, there can be an undesirable slippage of the flat, stacked objects within the stack. Therefore, an edge-to-edge, palleted stack may not form on the support device used as the interim support.

SUMMARY OF THE INVENTION

The purpose of the invention is to improve a device of the kind just described so that the stacks to be palleted can be placed edge-to-edge on the support device.

According to this invention, the supply conveyor consists of two conveyor belts which are separately controllable and positioned flush with one another in a common plane parallel to the support device. The front delivery rollers of the belts can be moved both in the same and opposite directions by movement of lower belt strands.

In a device according to this invention, the two conveyor belts of the supply conveyor are first aligned so that their front diverter rollers are located close together and are separated from each other only by a narrow gap. In this position, the two conveyor belts jointly form a conveyor with upper strands which are controlled so that the stack to be palleted is moved properly into a delivery position above the support device. The pallet is moved with the stack and passes without hindrance through the gap located between the two conveyor belts. If the stack has been moved into its delivery position above the support device, then the two front diverter rollers are moved in such a manner that the gap located between the rollers is located beneath the transverse or longitudinal middle plane of the stack, depending on whether the stack is to be palleted resting transversely or longitudinally. If the front diverter rollers of the conveyor belts have been moved into this delivery position, which can take place, of course, before the conveyance of the stack into its delivery position, then they will be moved apart at an equal speed, and specifically only by movement of their lower strands, so that the conveyor belt peels off under the ejected stack. The ejected stack falls symmetrically through the enlarging gap between the two front diverter rollers and onto the support device.

The width of the conveyor belts forming the supply conveyor preferably corresponds to the width of the stacked surface of the pallet. In order to transfer the stacks to be palleted in the transverse direction in proper position to the supply conveyor, an output conveyor of smaller width, which can move in the transverse direction, may adjoin the conveyor belt of the supply conveyor.

In an additional refinement of the invention, the support device consists of two conveyor belts aligned in a common plane. Mutually facing conveyor belt delivery rollers can move opposite each other by movement of their lower strands. In this manner, the front delivery rollers of the two conveyor belts forming the support device, which face each other, can be moved apart. The stacks, therefore, drop from the support device onto the pallet or the pallet stack while retaining a proper delivery pattern. While the items are being moved apart, only the lower strands of the conveyor belts will move. The upper supporting strands are, in a sense, peeled off from the underside of the delivered stack.

The conveyor belts can consist of broad conveyor belts or, preferably, of families of narrow conveyor belts running parallel to each other.

BRIEF DESCRIPTION OF THE DRAWINGS

One embodiment of the invention will be explained in greater detail with reference to the drawing figures.

DESCRIPTION OF THE PREFERRED EMBODIMENT

Figure 1:
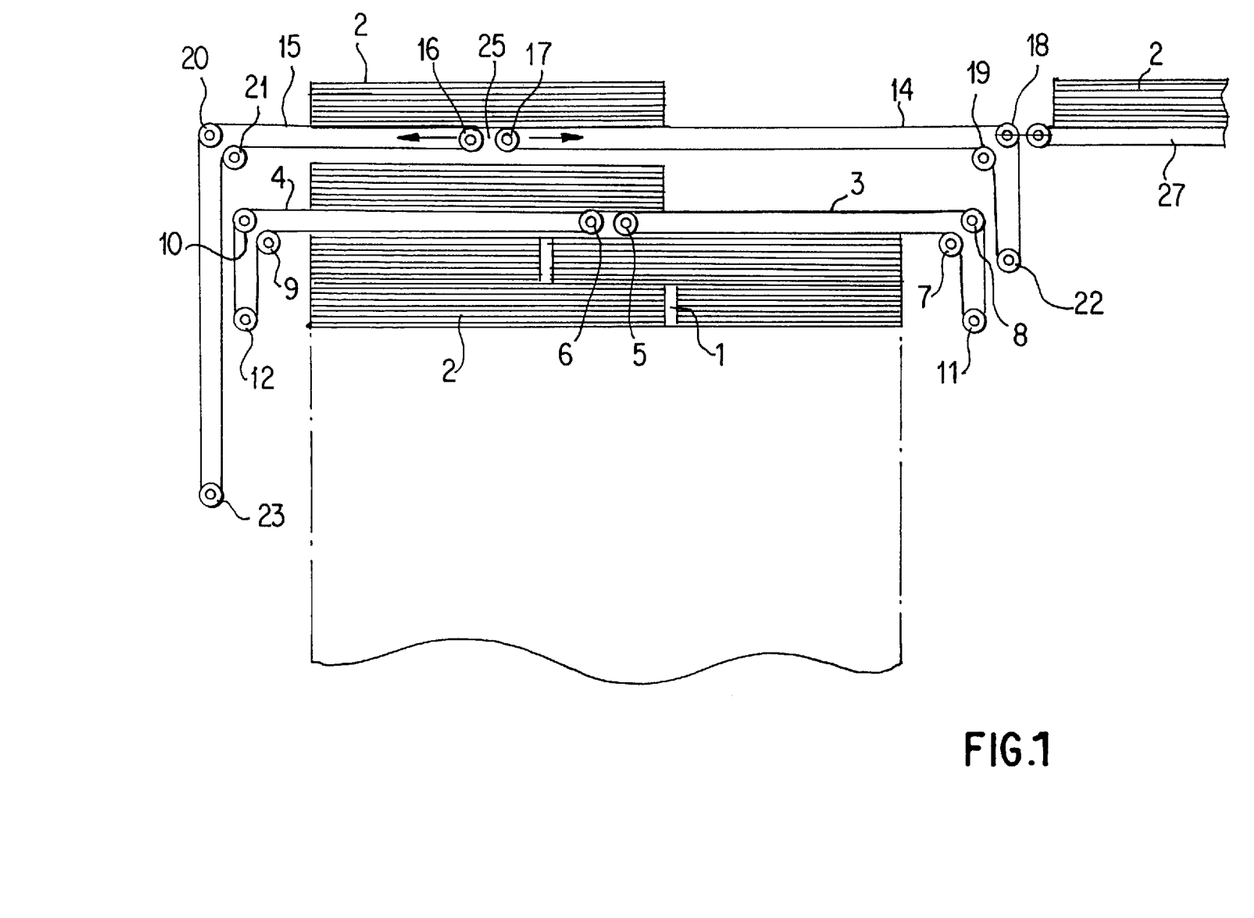
FIG. 1 is a side view of the palleting device in schematic representation during preparation of a third stack layer to be delivered on the pallet on which a support device forming an intermediate layer is seen.

Shown in FIG. 1 is a surface 1 of a pallet not illustrated in greater detail, on which there are already two levels or layers of stacked bags 2. Delivery takes place in two rows so that there are three adjacent stacks in a longitudinal direction or two stacks resting next to each other in the transverse direction. The stacks of each position at least partly overlap so that the stability of the palleted stack is increased.

The pallet is located on a hoisting table (not illustrated) which can be elevated and lowered. During palleting, after formation of each layer of the stack, the table is lowered by the height of the stack.

Above the pallet, there is a support device. The support device includes two continuous conveyor belts 3 and 4. Front diverter rollers 5 and 6 of the belts face each other and are seated in a skid moving in a frame. The conveyor belts 3 and 4 move under the actions of frame-mounted diverter rollers 7, 8, 9 and 10 and of elevated and lowered diverter rollers 11 and 12. The diverter rollers 11 and 12 are controlled so that during their movement, as the diverter rollers 5 and 6 approach and move away from each other, only the lower conveyor belt strands are moved. As a result, during delivery of a layer of stacks aligned at a particular formation onto the pallet or onto the pallet stack, the upper strands peel off from the stack without relative movement with respect to the undersides of the stacks.

The belts 3 and 4 forming the support device have widths which correspond to the width of the pallet. The belts 3 and 4 can be constructed from continuous families of belts. The drive units (not illustrated) for the conveyor belts 3 and 4 forming the support device are controlled so that their upper strands, during delivery of the layer of stacks, will not undergo any motion relative to the stacks. In order to be able to move the skids supporting the diverter rollers 5 and 6 back into their close side-by-side position after they have been moved apart, special drives or springs can be provided.

Above the conveyor belts 3 and 4 forming the support device, a supply conveyor is provided. The supply conveyor consists of the two conveyor belts 14 and 15. The two continuous conveyor belts 14 and 15 run along mutually opposing front delivery rollers 16 and 17 which can move in the frame (not illustrated) of the palleting device. The two conveyor belts 14 and 15, like the two conveyor belts 3 and 4 of the support device, have middle sections which extend in parallel planes above and parallel to the plane of the pallet. The conveyor belts 14 and 15 run along diverter rollers 18, 19, 20 and 21 attached to the frame. Diverter rollers 22 and 23 can be elevated and lowered. The upper sections of the conveyor belts 14 and 15 are located in a common plane and, by control of the diverter rollers 22 and 23, execute a movement in the same direction conveying the stacks 2. The conveying movement takes place while retaining a narrow gap 25 between the front delivery rollers 16 and 17, so that the stack 2, moving into its position, can pass by this gap without hindrance.

In the delivery position of the stack 2 visible in FIG. 1, from which the stack is ejected onto the support device located underneath without lateral positional change, the gap 25 is disposed in the middle transverse plane of the stack 2. In this delivery position, the conveyor belts 14 and 15 are driven so that only their lower strands execute opposing movements at the same speed. The upper strands of the conveyor belts 14 and 15, therefore, peel off from the lower side of the stack 2, and the stack falls symmetrically through the enlarging gap 25 and onto the support device.

The front delivery rollers 16 and 17 of the conveyor belts 14 and 15 can be moved right at the beginning of the conveyance process into their delivery position. Movement of the front delivery rollers can also take place during the conveyance process or after completion of the conveyance process.

The conveyor belts 14 and 15 can either have widths corresponding to the width of the pallet or be constructed from a family of continuous conveyor belts. The stacks 2 to be placed onto the conveyor belts 3 and 4 in a particular delivery pattern are supplied to the conveyor belts 14 and 15 individually from a delivery conveyor 27, which can move in the manner shown in FIG. 2, transverse across the width of the conveyor belts 14 and 15. In this way, the stacks 2 can be delivered with proper transverse orientations relative to each other onto the conveyor belts 14 and 15.

Figure 2:
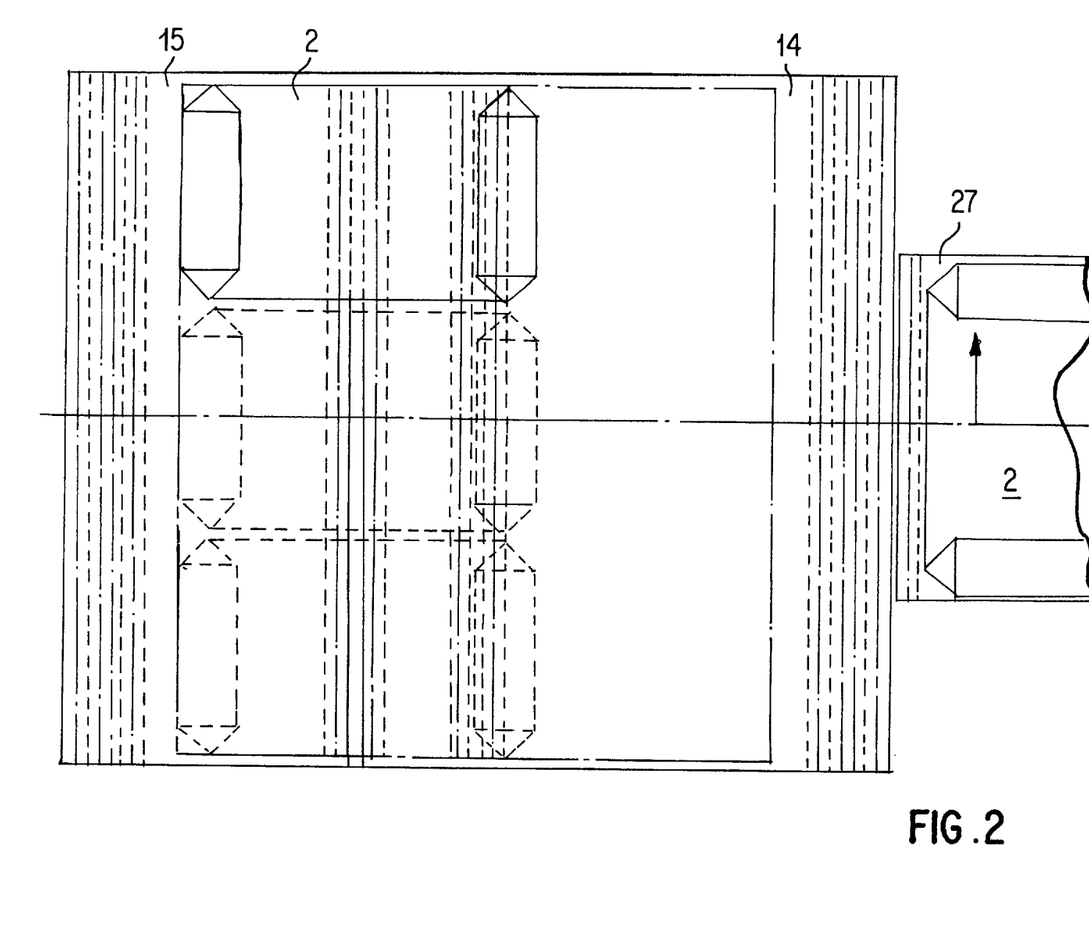
FIG. 2 is a top view of the device according to FIG. 1, from which the delivery pattern forming on the support device is visible.

From FIG. 2 it is apparent that in the front row there are already two stacks 2 that have been placed side by side in the longitudinal direction onto the support device. The final stack 2 is already in its delivery position on the conveyor belts 14 and 15.

Figure 3:
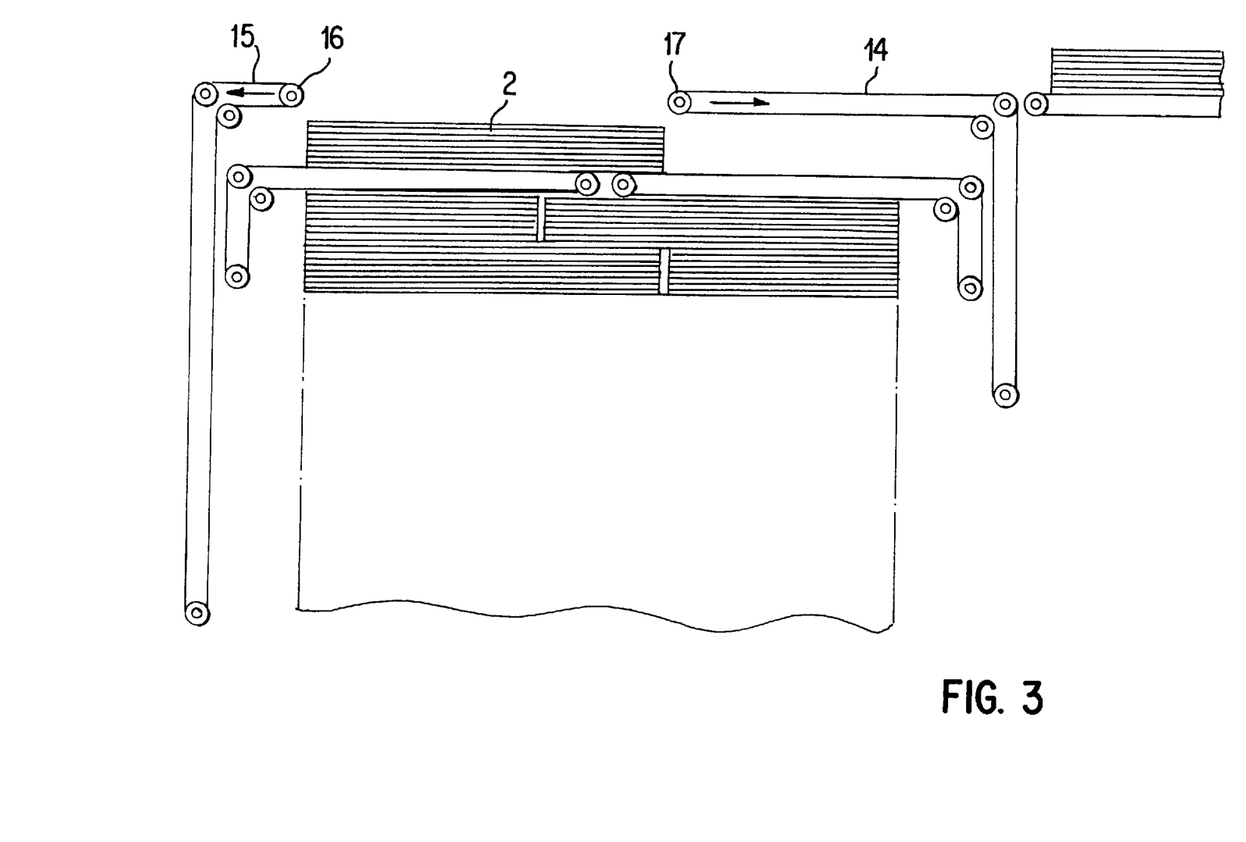
FIGS. 3 and 4 are representations corresponding to FIGS. 1 and 2 after delivery of a row of stacks onto the support device.

FIG. 3 shows that the conveyor belts 14 and 15 are in positions in which their front diverter rollers 16 and 17 are moved so far apart that the stack 2 has slipped through the gap defined between them.

Figure 4:
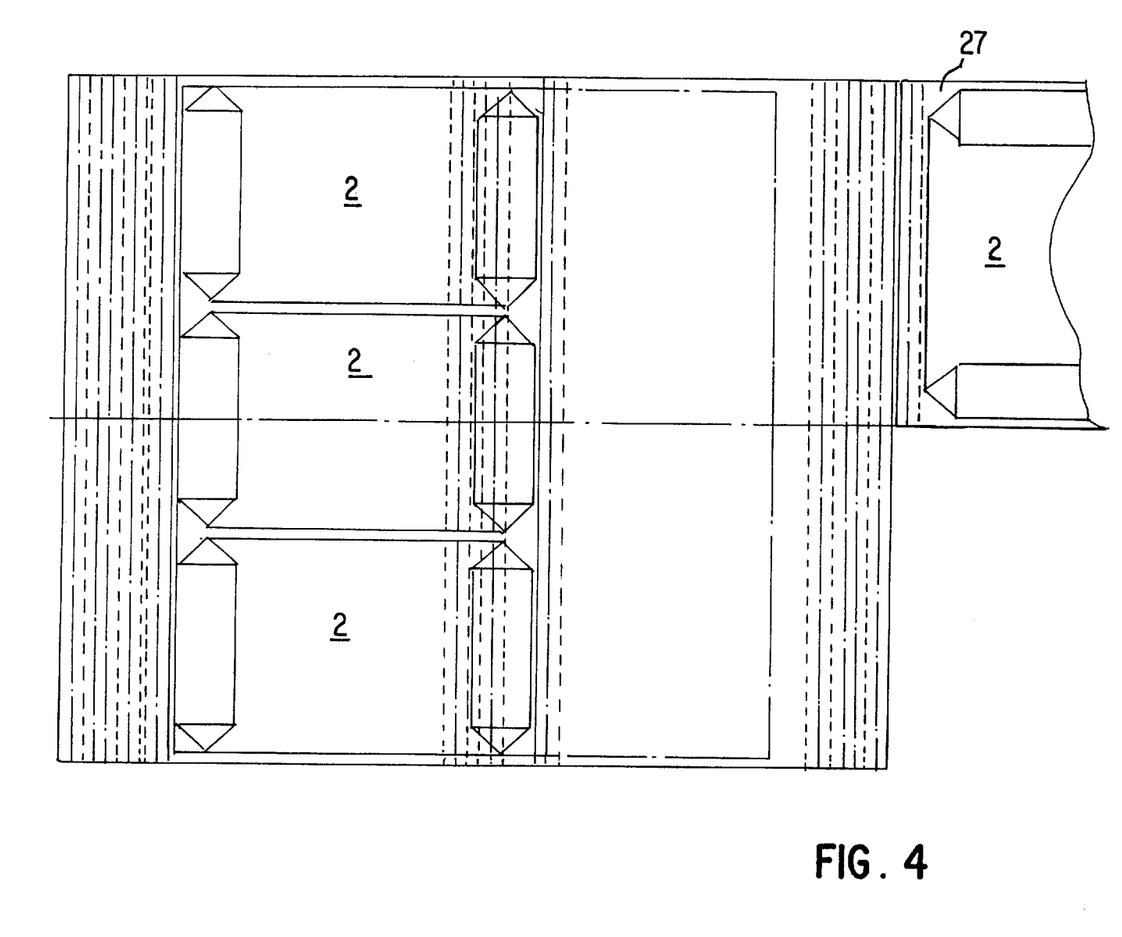

FIG. 4 illustrates the front row of the stacks as being located in parallel in their longitudinal direction on the support device. The supply conveyor 27 has already been moved into a position in which it sends the first stack of the second row transversely.

Figure 5:
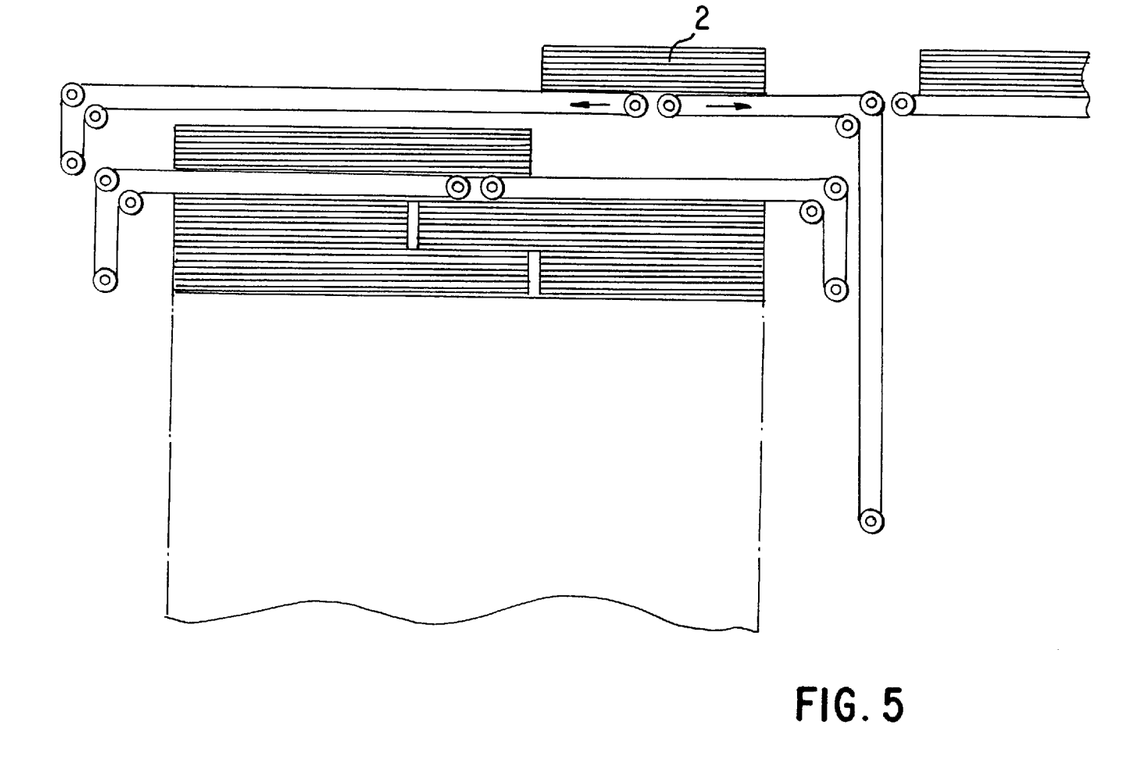
FIGS. 5 and 6 are representations corresponding to FIGS. 1 and 2 after supply by the supply conveyor of the stack to be delivered crosswise in the second row.
Figure 6:
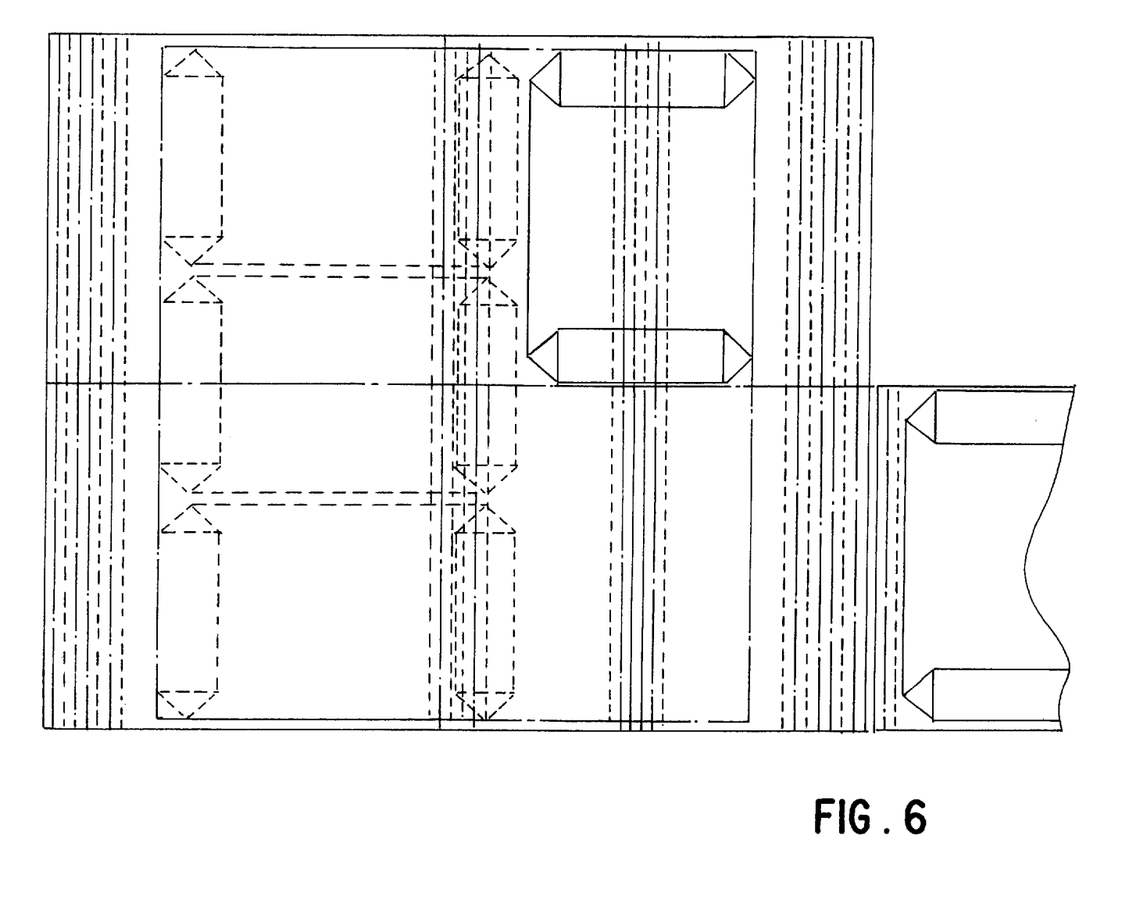

FIGS. 5 and 6 show a position in which the first stack 2 of the second row of the layer to be stacked together has been moved into its delivery position above the support device.

Figure 7:
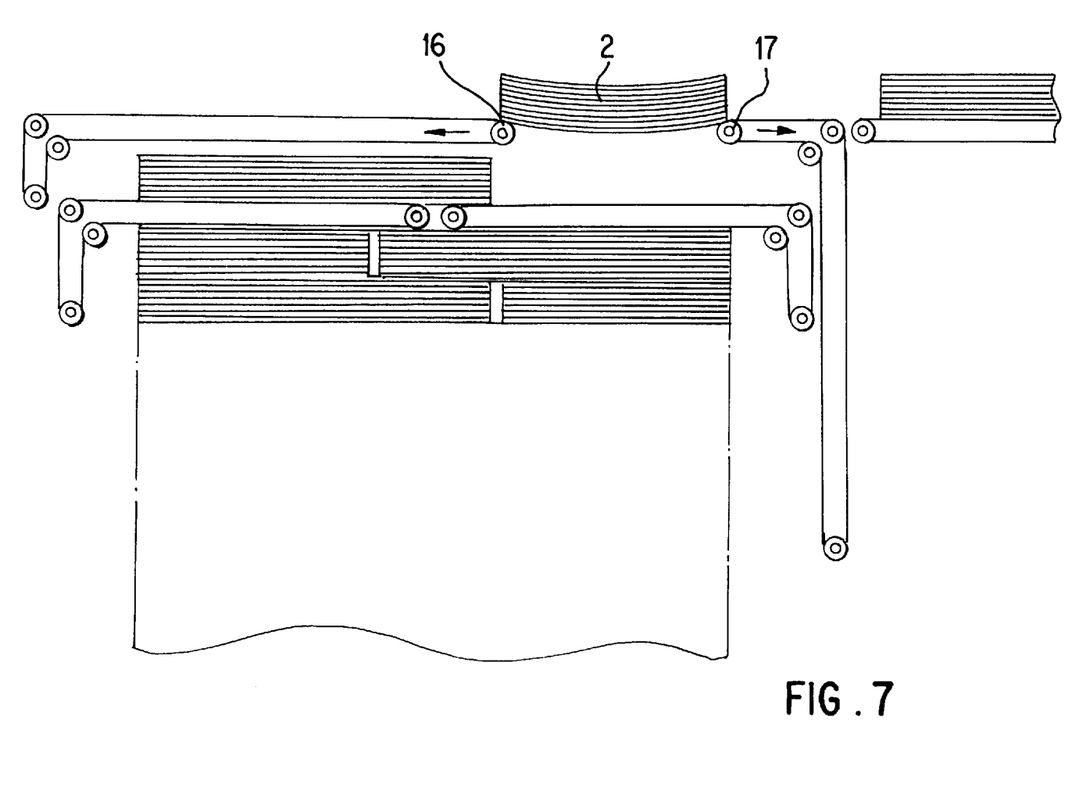
FIGS. 7 and 8 are representations corresponding to FIGS. 1 and 2 during the delivery of the first stack of the second row on the support device.

FIG. 7 shows that to eject the stack 2, the delivery rollers 16 and 17 are moved in the same direction at the same speed symmetrical to the longitudinal middle plane of the stack 2. The stack, accordingly, easily slips down without edge displacement, so that, after release by the delivery rollers, it can fall straight and without lateral tipping onto the support device.

Figure 8:
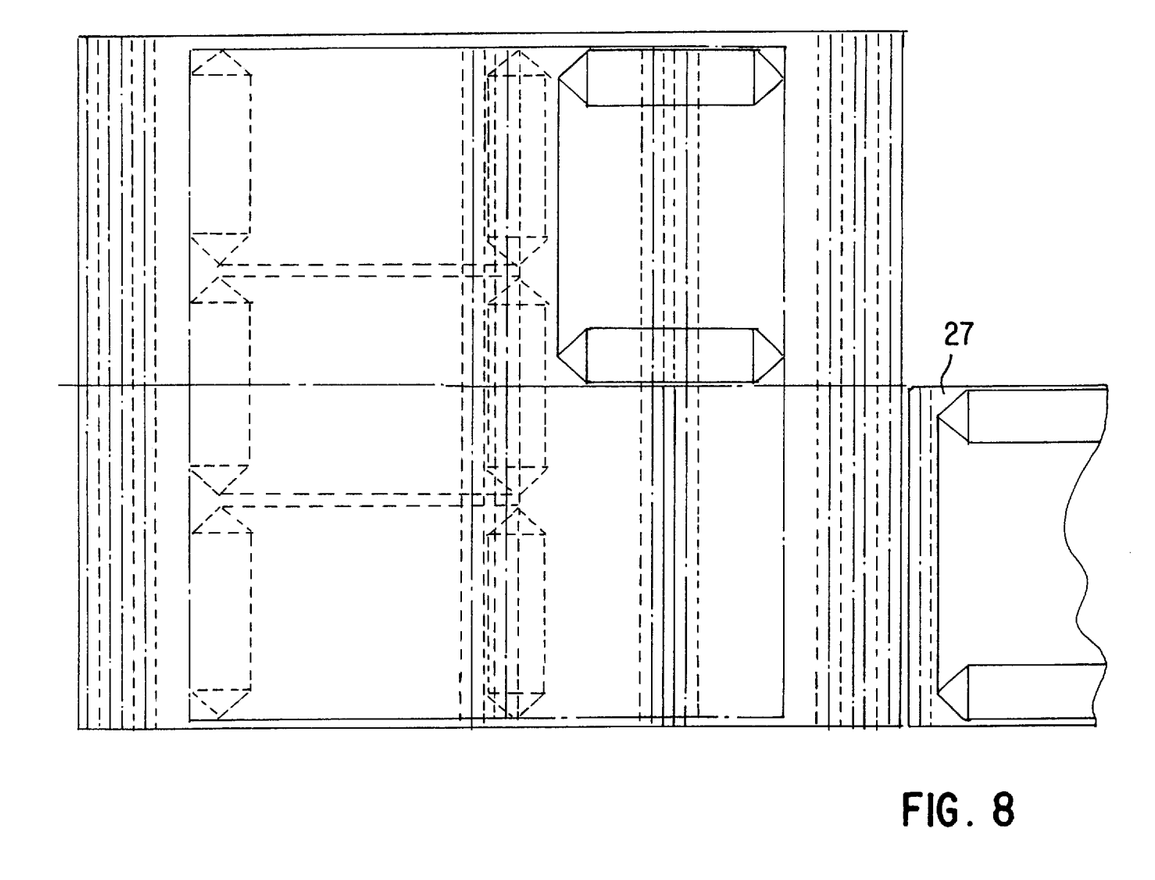

FIG. 8 shows the output conveyor 27 after it has already been moved into the left position during delivery of the right stack. After the corresponding reversing of the drive units of the conveyor belts 14 and 15, the second stack of the second row of the pending layer can be moved transversely into its delivery position.

Figure 9:
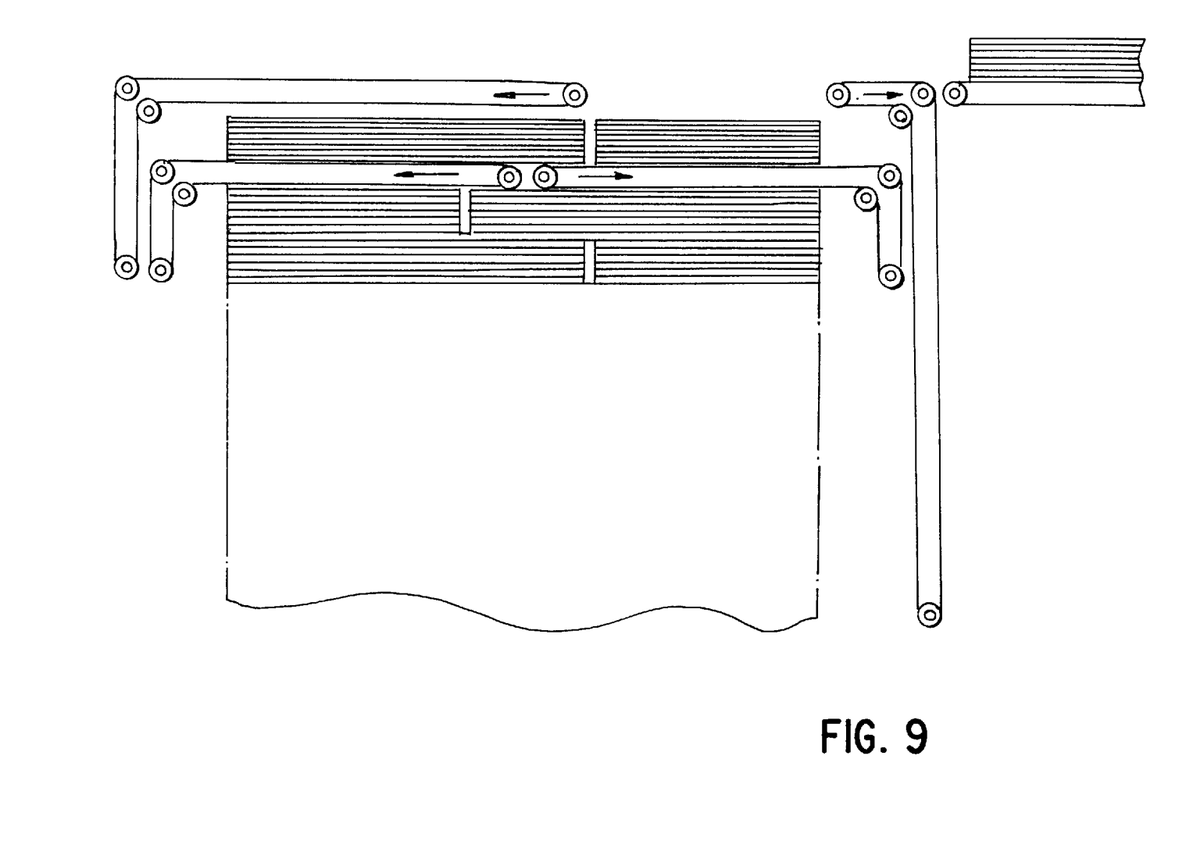
FIGS. 9 and 10 are representations corresponding to FIGS. 1 and 2 after delivery of the second stack crosswise in the second row of the support device.
Figure 10:
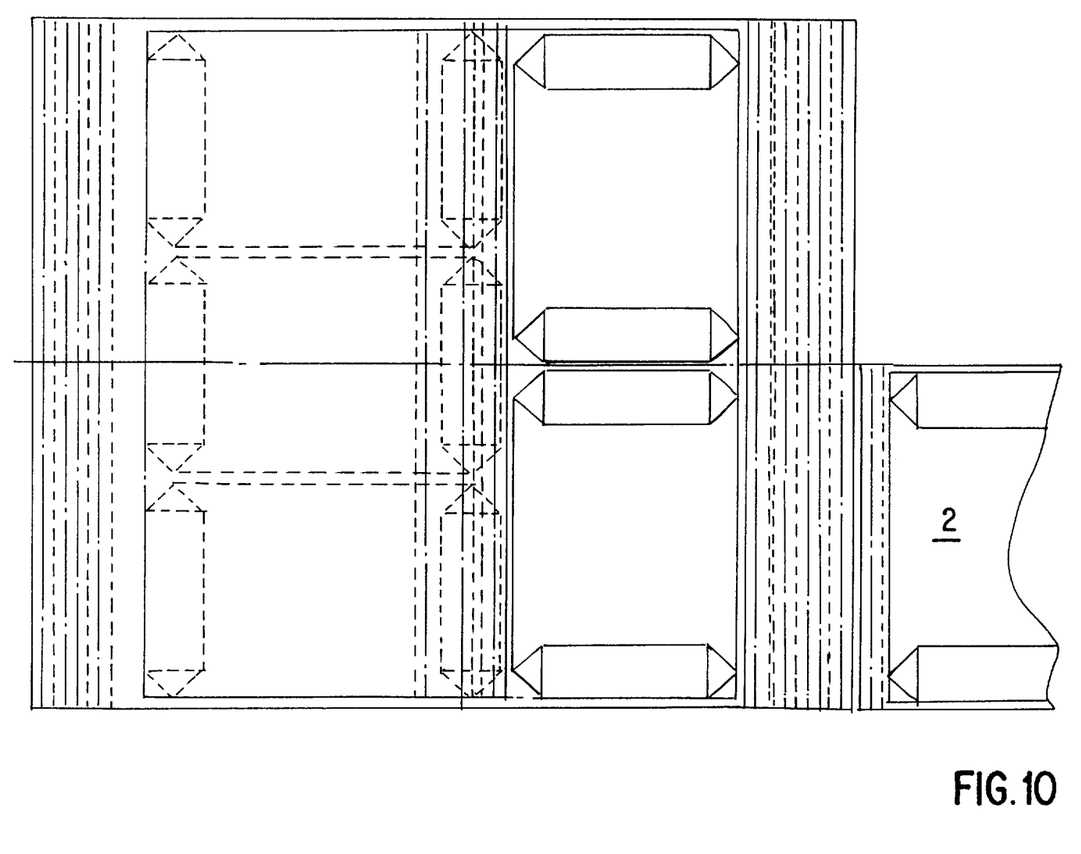

FIGS. 9 and 10 illustrate a situation in which the last stack of the layer to be delivered next has been ejected onto the support device. The output conveyor has already moved the next stack 2 which is to be positioned transversely into position as the first stack in the first row of the layer.

Figure 11:
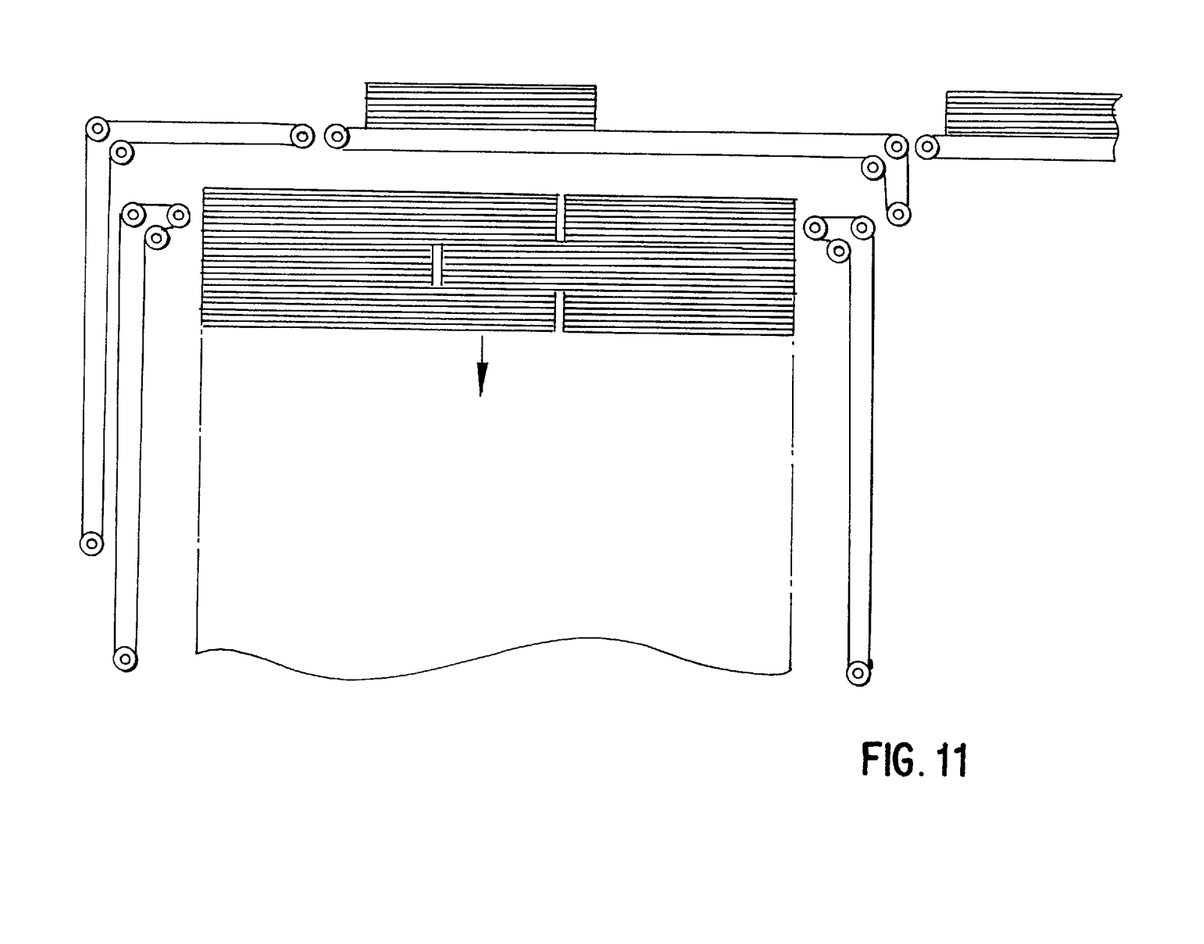
FIGS. 11 and 12 are representations corresponding to FIGS. 1 and 2 during the supply of the first stack to the front row in a transverse position.
Figure 12:
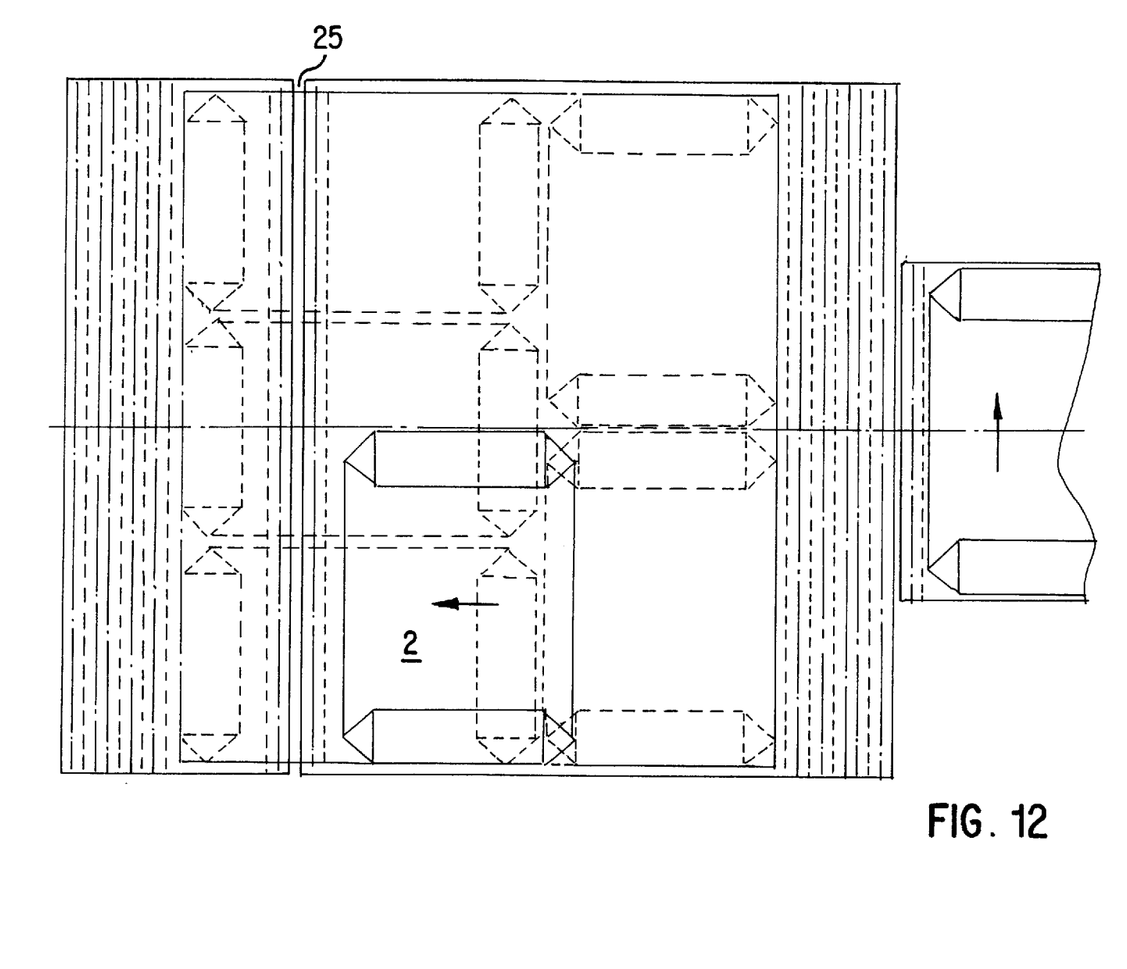

FIGS. 11 and 12 show a situation in which the next stack 2 is moved transversely into its delivery position in the front row of the layer. Conveyance takes place in the direction of the arrow until the gap 25 between the front delivery rollers aligns with the longitudinal middle plane of the stack 2. Then, due to the previously described movement apart of the delivery rollers, the delivery of the stack on the support device can take place.

Figure 13:
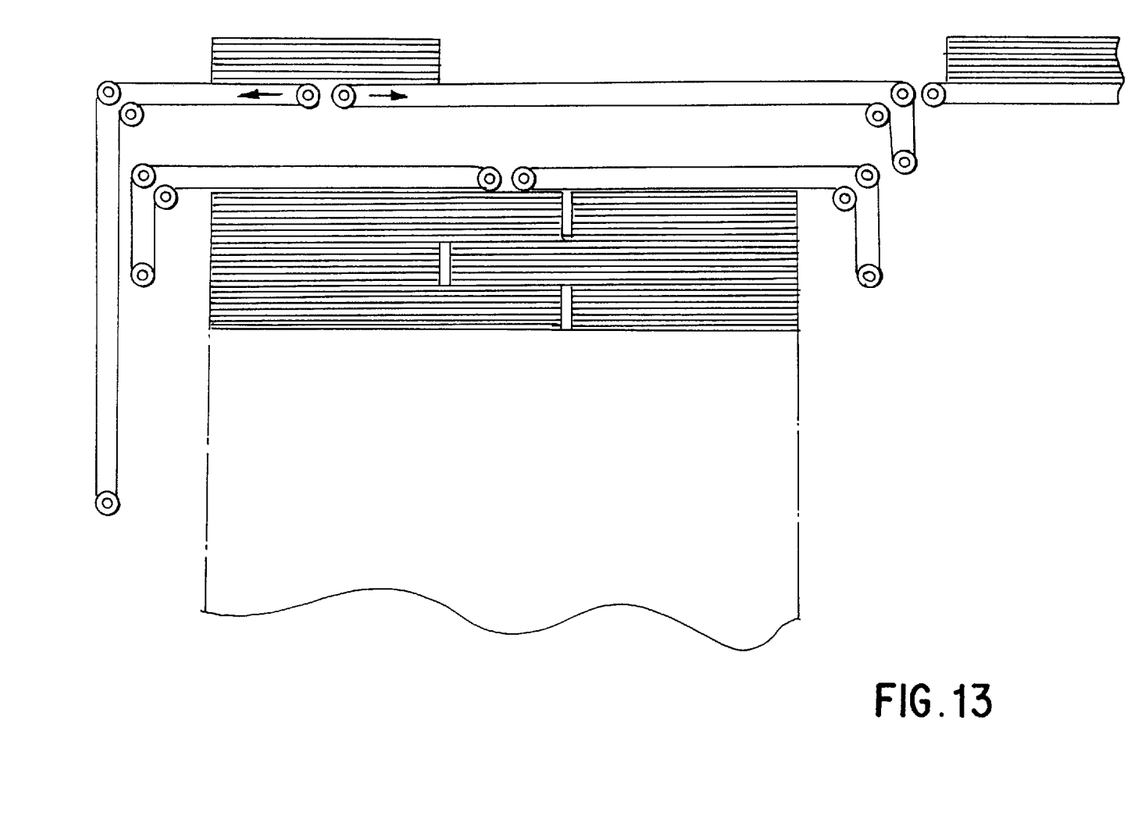
FIGS. 13 and 14 show the alignment of the first stack of the front row in transverse position before delivery onto the support device.
Figure 14:
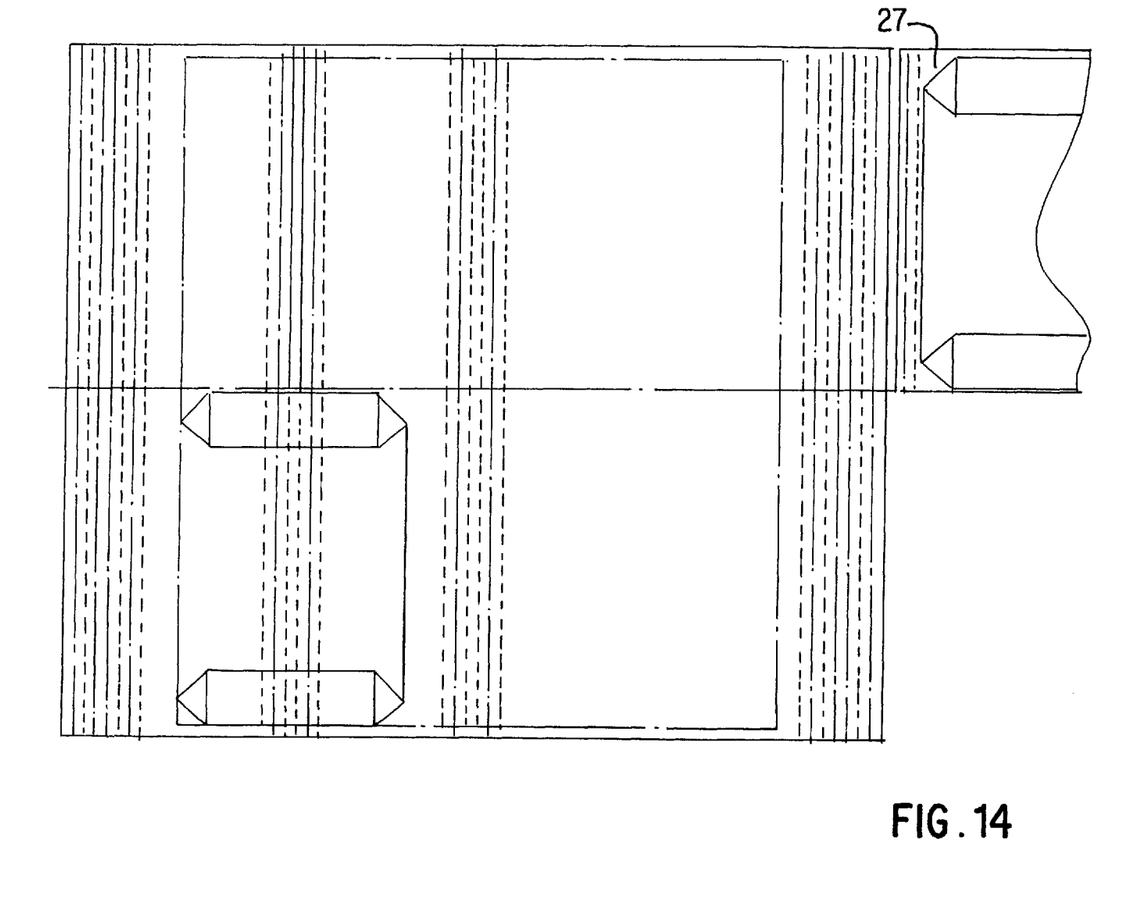

FIGS. 13 and 14 illustrate a situation in which the output conveyor 27 has been moved into its right position. In this position, the output conveyor can output the next stack in proper position onto the conveyor belts 14 and 15. The conveyor belts 14 and 15 then convey the stack into its transverse delivery position in the front row of the layer.

I claim:

1. A palleting device for palleting stacks of flat objects with a pallet having an adjustable height comprising:

a supply conveyor for supplying said stacks of flat objects, a moving support device, located above the pallet, onto which the stacks are delivered from said supply conveyor in formation on the pallet and from which a stack is ejected by a release motion of the moving support device while retaining a stacking pattern of the stack, the supply conveyor including two conveyor belts which are separately controllable and aligned with each other in a common plane parallel to the moving support device, and front delivery rollers for said two conveyor belts which are movable in both the same and opposite directions due to movement of lower conveyor belt strands.

2. A palleting device according to claim 1, wherein the moving support device is formed by conveyor belts and widths of the conveyor belts of the support device correspond to a width of the pallet.

3. A palleting device according to claim 1, and further comprising an outlet conveyor of smaller width than said supply conveyor that can be moved in a transverse direction adjoining said supply conveyor.

4. A palleting device according to claim 1, wherein the moving support device includes two conveyor belts aligned in a common plane, and further comprising mutually facing eject rollers for said two conveyor belts which can move opposite to each other by movement of lower conveyor belt strands.

* * * * *